Figure 3:
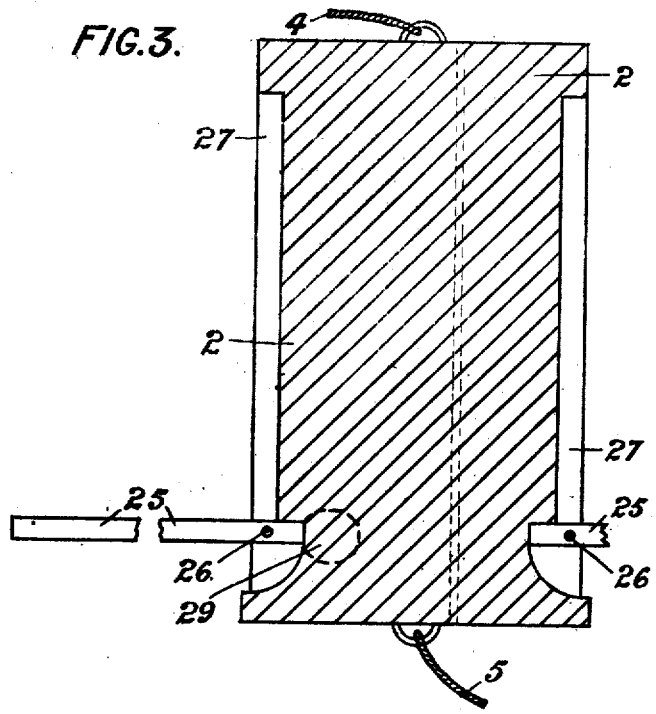

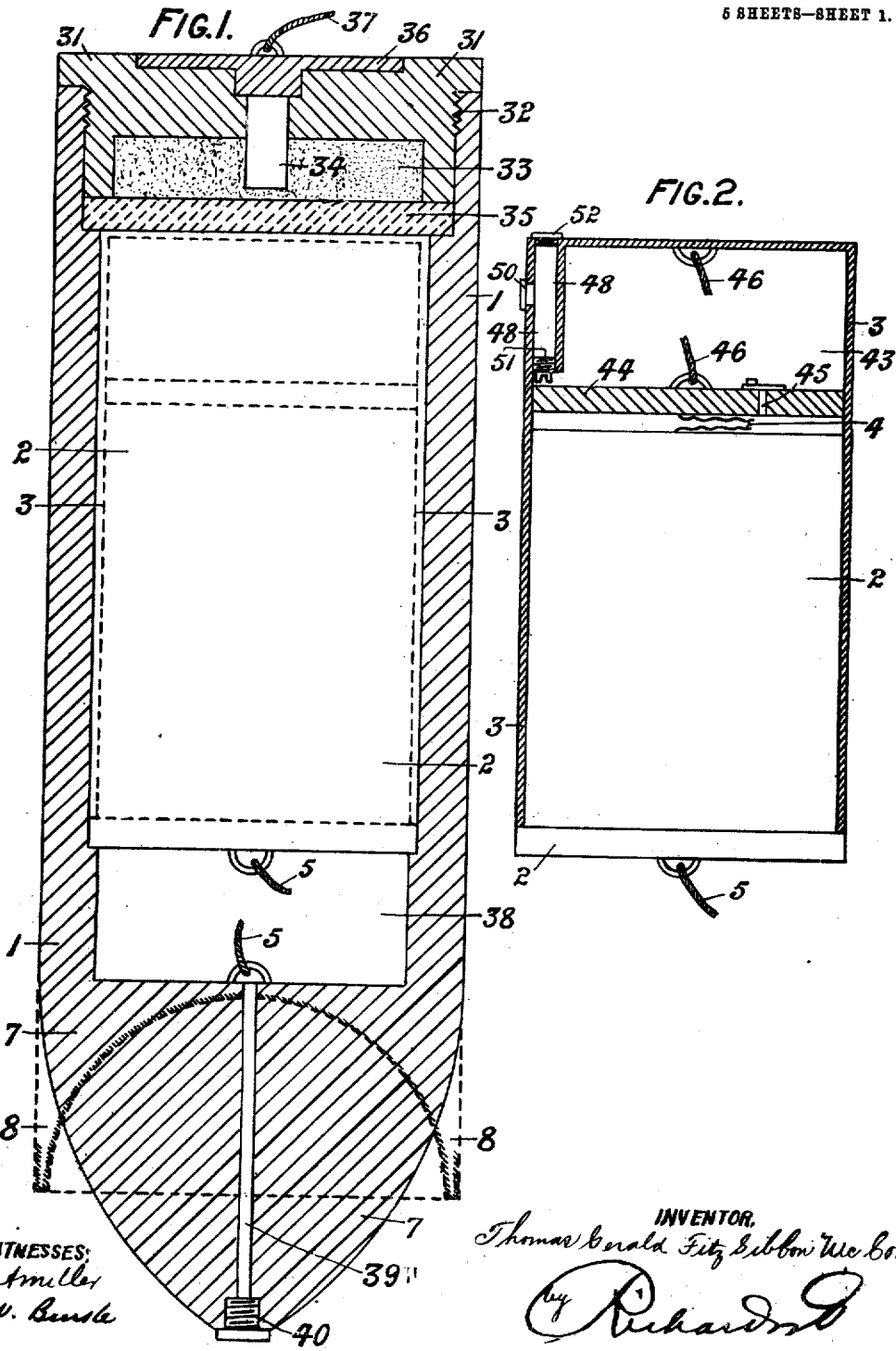

T. G. FITZ G. McCOMBIE.
EXPLOSIVE MINE OR PROJECTILE.
APPLICATION FILED DEC. 18, 1905.

910,942.

Patented Jan. 26, 1909.

5 SHEETS—SHEET 2.

WITNESSES:
A. Miller.
W. Bush.

INVENTOR.
Thomas Gerald Fitz Gibbon McCombie
by Richardson
ATTYS.

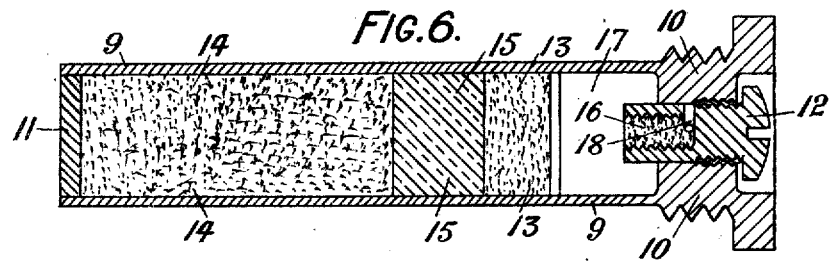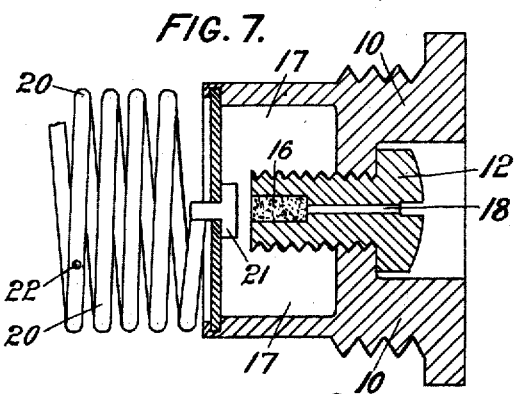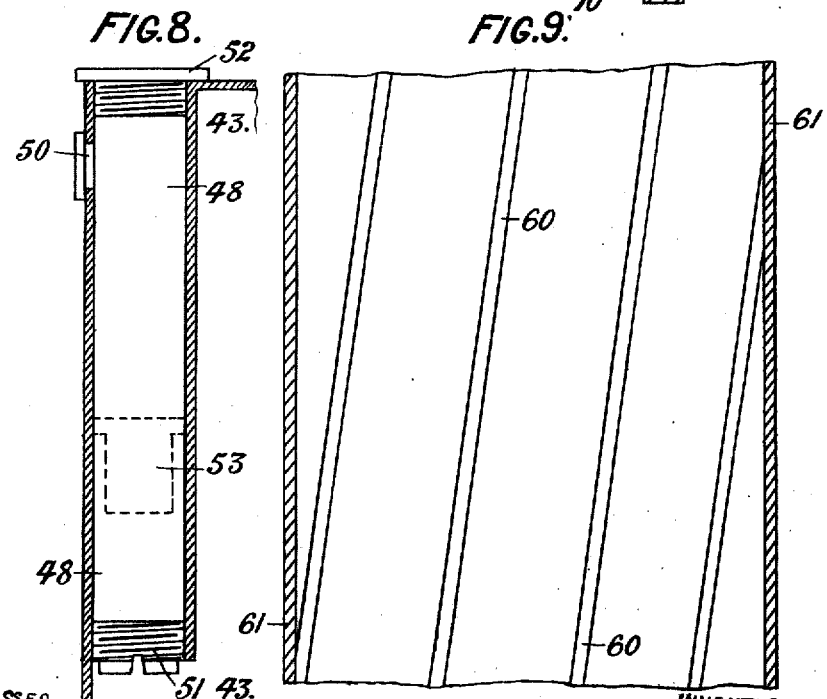

T. G. FITZ G. McCOMBIE.
EXPLOSIVE MINE OR PROJECTILE.
APPLICATION FILED DEC. 18, 1905.
910,942.
Patented Jan. 26, 1909.
5 SHEETS—SHEET 4.
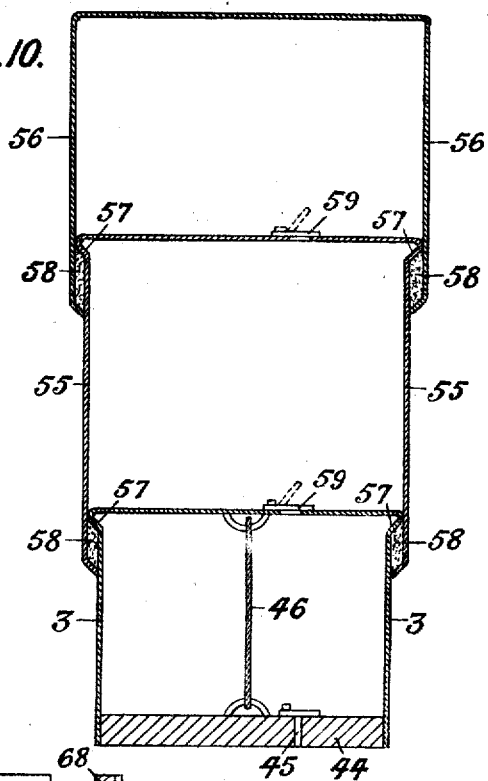
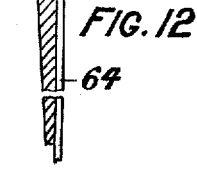 
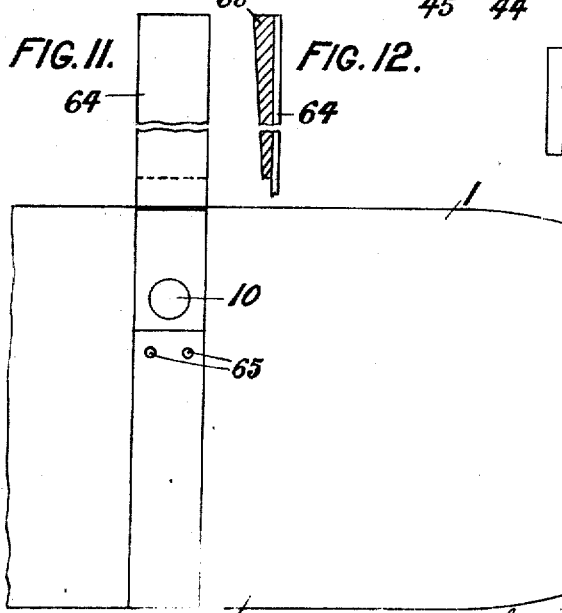
WITNESSES:
A. Miller
W. Burke
INVENTOR
Thomas Gerald Fitz Gibbon McCombie
by Richard
ATTYS T. G. FITZ G. McCOMBIE.
EXPLOSIVE MINE OR PROJECTILE.
APPLICATION FILED DEC. 18, 1905.
910,942.
Patented Jan. 26, 1909.
5 SHEETS—SHEET 5.
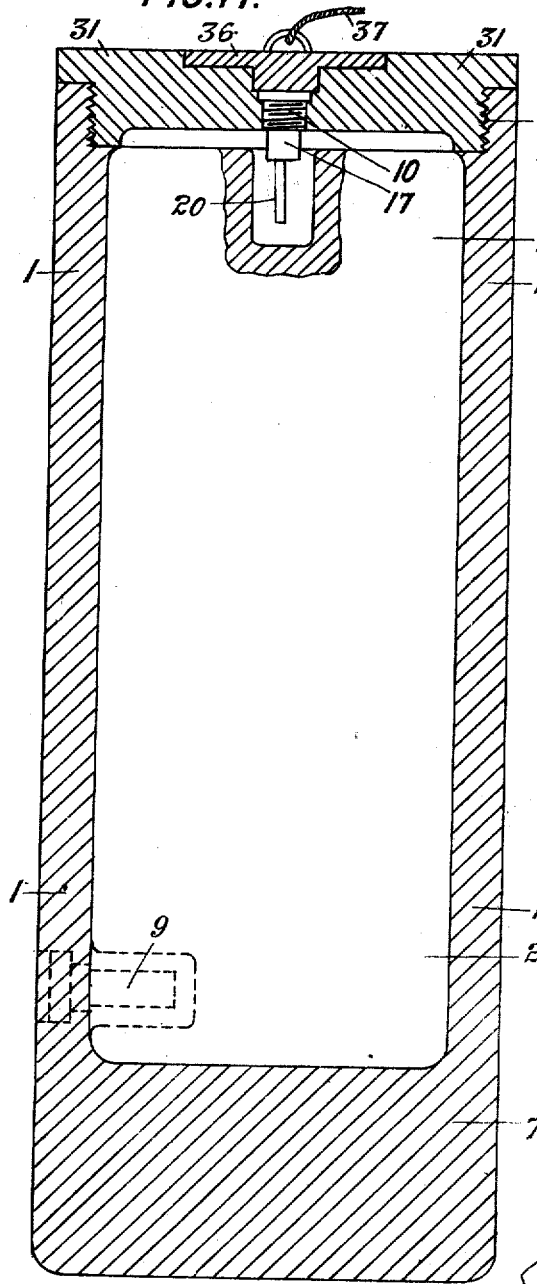
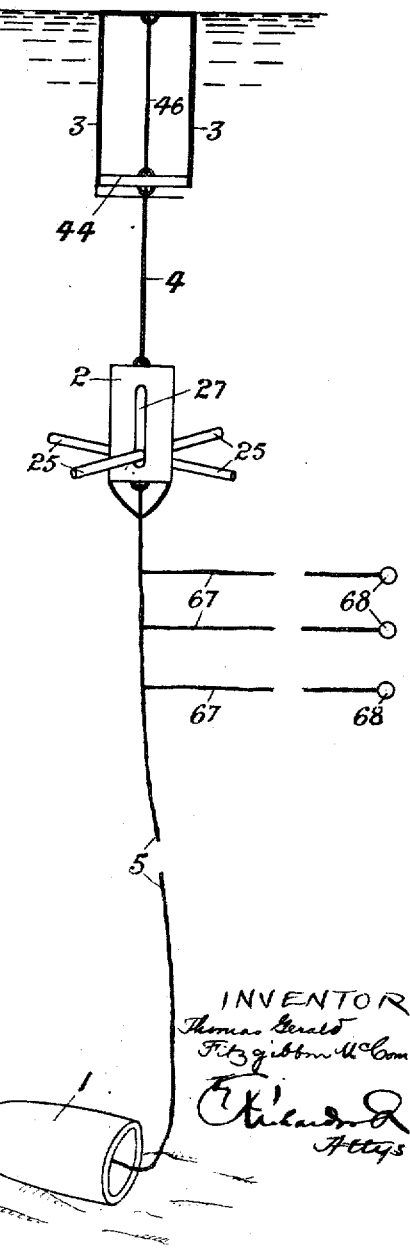

UNITED STATES PATENT OFFICE.

THOMAS GERALD FITZ GIBBON McCOMBIE, OF MONKSTOWN, IRELAND, ASSIGNOR OF ONE-HALF TO JOHN BEDELL STANFORD MacILWAINE, OF COUNTY OF DUBLIN, IRELAND.

EXPLOSIVE MINE OR PROJECTILE.

No. 910,942.   Specification of Letters Patent.   Patented Jan. 26, 1909.

Application filed December 18, 1905. Serial No. 292,239.

*To all whom it may concern:*

Be it known that I, THOMAS GERALD FITZ GIBBON McCOMBIE, a subject of the King of England, residing at Monkstown, County Dublin, Ireland, have invented new and useful Improvements in Explosive Mines or Projectiles, of which the following is a specification.

This invention has reference to explosive mines or projectiles used in naval warfare for the purpose mainly of destroying enemies' ships or vessels; and it has primarily for its objects and effects, among others, to provide an explosive mine or projectile which can be thrown through the air for a long distance accurately, and when exploded, will act similarly to a mine or torpedo on a ship or vessel, whether such vessel be an ordinary warship, cruiser, or other surface craft, or a submarine vessel. According to this invention, this explosive mine or projectile is so constructed and adapted externally, that it can be fired from a gun above water in the ordinary manner of a projectile, towards the ship or vessel it is intended to destroy; and when it reaches the vessel, or strikes the water, it will sink, and expel an explosive, or a container containing an explosive, which sinks, or it will sink as a whole, and when sunk to the required or predetermined depth, either by an automatic timing fuse or means, or by a ship or object coming in contact with it, will explode and act as a mine. Thus the article constitutes a projectile-mine; but at the same time, if desired, it can be used as an ordinary mine and dropped into the water in certain cases, and for certain uses, in which case a timing shell, as when fired from a gun is not necessary.

By one construction above described, the mine or charge of explosive can be thrown, or placed and moored in position, by being fired or projected from ordnance in the manner of an ordinary projectile; or by dropping or throwing it overboard from a vessel; while according to a modification, the mine or projectile is used as a projectile-mine, that is, the shell containing the explosive is so arranged and constructed, that when it strikes say a ship, it will fall dead alongside and sink, and being provided with an aperture for the entrance of water, and means or agents within it which are acted upon and ignited by the water, within a given time the charge or mine is ignited, so that it—the projectile-mine—is exploded at the required predetermined depth, and practically under the ship's bottom, so acting as a true mine.

The invention will be further described with the aid of the accompanying drawings which illustrate it generally, and also show different modifications of it, and some of the parts of which it is comprised in detail.

Figure 4:
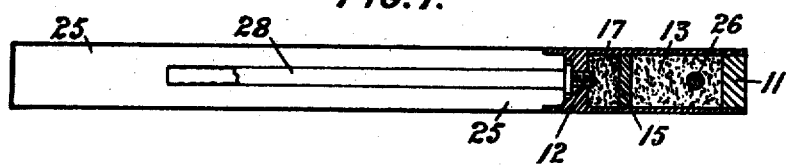
Figure 5:
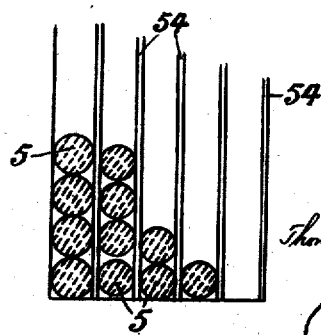

In these drawings, Figure 1 is a longitudinal section of a projectile-mine complete, that is, the missile comprising all its parts assembled, with the exception of the igniter, which is hereafter set forth with reference to Fig. 6. Fig. 2 shows in detail a section or part of the projectile mine shown in Fig. 1, namely, a casing used therein, adapted to act as a buoy. Fig. 3 is a longitudinal section showing in detail the mine proper, used in the projectile mine; and Fig. 4 is a longitudinal section showing a detail of this mine. Fig. 5 is a detail showing one method of coiling the mine mooring line. Fig. 6 is a longitudinal section of an igniting fuse according to this invention; and Fig. 7 is a detail showing a portion of a modification of fuse shown in Fig. 6. Fig. 8 shows in section a detail of a sinking tube used in connection with the projectile mine. Fig. 9 is an outside view showing spiral projections on the outer shell of the mine, for causing it to rotate when fired from a gun. Fig. 10 shows in section, diagrammatically, a modification of buoy for the mine under this invention. Fig. 11, 12, and 13 are details illustrating the mode of protecting the side-inserted fuses in the projectile case from the explosive force of the gun. Fig. 14 is a longitudinal section showing projectile mine of the non-floating type according to the invention. Fig. 15 is a view of the device showing the parts in the positions which they assume after they leave the casing.

In the form of mine according to this invention, shown in Figs. 1, 2, 3 and 4, that is, one in which the explosive charge or mine proper is adapted to be exploded by contact, when sunk to the required depth, the shell comprises an outer part or shell proper 1, and an interior part or casing 3, containing the mine proper or explosive charge 2, consisting of a solid body of explosive, which, when the shell reaches the water, is, through an agent or means hereafter described, caused to be ejected from the shell 1, and in the construction shown, from the rear end of same. In this shell, the explosive or mine proper 2 is contained, with other parts, within a container or casing 3 and this casing, with the mine and parts, are first ejected from the shell proper 1 on reaching the water, and then the explosive or mine proper 2 is ejected from the casing 3; and the mine itself when struck, is caused to ignite and explode. The casing 3 itself, to which the mine will be held captive by a suitable mooring line or connection 4, is adapted to act as a buoy or floater, and to hold up the mine 2 at the required depth from the surface, say such a depth as is usually employed with ordinary mines. And further, in some cases, the outer body or projectile shell 1 is connected with the mine proper 2 by a mooring line 5, and the mine 2 is thereby moored; that is, the shell case 1, after the casing 3 with the mine 2 are ejected from it, sinks to the bottom; and then acts as an anchor or mooring to the mine and floater case 3 as seen in Fig. 15.

In some cases, as in the case shown, the mine or charge proper 2 is in the form of a solid compressed body made of the exact form required, and to fit with the desired degree of closeness, within the casing 3; the mooring line 4 for connecting the mine to the casing 3 being attached to the top of the mine body 2. And where the mine is to be moored by the shell 1, the mooring line 5, by which this is effected, is connected to the bottom of the mine body 2. In some cases however, the explosive charge when not in the form of a solid block—or even when in this form, if desired—is contained within another suitable light case or envelop of metal, or any other suitable material.

With regard to the mode of exploding the mine body 2, in the construction shown in Figs. 3 and 4, this body is provided with an igniting and exploding means which will be hereafter described.

Referring again to the shell or projectile 1, in the case shown in Fig. 1, the head 7 of the shell, as shown in full lines is of the ordinary ogival shape; but in other cases, it may be made of cup-shape as shown by the dotted lines marked 8, for the purposes, and to produce the actions or effects hereinafter described; or, it may be a plain square-headed shell. These heads will in some cases be made of any suitable soft material, such for instance, as lead—sheathed or cased if desired—or other suitable soft white metals or alloys, papier maché, by which, when the shell strikes an object, it will not penetrate it, or break up itself, or fracture it, but the shell is stopped, and caused to fall straight down through the water, after its flight has been stopped. The particular form of nose or head used will depend upon the particular conditions under which, or purpose for which the projectile-mine is to be used, or the object it is intended to destroy.

With regard to the means of igniting the explosives, such as guncotton, tonite, or other explosive used in connection with this invention, this is effected in some cases by fuses in which a material, such as potassium or sodium, or other equivalent substance, is used, and by admitting water to such substance, whereby the material ignites or burns, and the charge of explosive or mine proper is either directly or indirectly ignited. These fuses may also be, and are in some cases, used for producing the actions of separating the parts of the mine when required; and according to the particular function which it has to perform, so will it be adapted to act as a timing igniting device, when the admission of water is regulated or timed, or an instantaneous igniter where instantaneous firing or explosion is required, when the water is allowed to have free access at once to the fuse. Examples of such fuses are respectively illustrated in the annexed drawings in Fig. 6, and in Figs. 4 and 7, and these will be now described. The fuse shown in Fig. 6 is of the water igniting type just referred to, and it consists of a tube 9 having a breach 10 at one end, and a closing plug 11 at the other; and in the breach 10 there is a water admittance timing screw 12, in which there is a hollow end or chamber 16 for containing potassium or other substance which is ignitable by water; and this end extends into a chamber or space 17 of the fuse, next which is the explosive containing chamber 13, the space 17 for air being provided to support combustion of the potassium; while, at the outer end, there is a space or chamber 14 for containing an explosive, with a packing 15 between these portions 13 and 14. In the case of the water fuse being of the timed kind, the thread of the screw 12 is so made that water can pass down between it and the breach 10, and through holes 18 leading to the cavity 16 in the end of the screw containing the potassium or the like; and when water reaches these holes, and the ignitable material, it is ignited, and an explosive such as gunpowder being next the igniting substance in the cavity 16, this explodes the explosive in the chamber 13. This fuse may be employed anywhere in connection with the mine, where it is desired to ignite an explosive, that is, to explode the mine proper when it has sunk to the proper depth, or after the shell has been in the water a certain time, or for discharging the internal parts, namely, the casing 3 with the mine 2, from the shell 1. In the case of it being desired to ignite the fuse, and explode an explosive, instantly upon water having access to the part in which the fuse is disposed, a hole 18 is provided in the screw 12, so that water can have direct access into the potassium, or other igniting substance in the hollow end 16 of the screw, as shown in Fig. 7. In this fuse, 13 also, an air chamber 17 is provided around the end of the screw, to support the combustion of the potassium or the like, as in the fuse shown in Fig. 6. A further feature connected with this fuse shown in Fig. 7 consists in the employment of a fuse 20, composed of combustible substance, such as is used in ordinary fuses for blasting purposes, contained within a suitable tube, with an asbestos-covering, and having a priming 21 at its end, disposed within the air chamber 17, at which point it is ignited. In this case, this fuse 20 becomes the time fuse, but the igniter is an instantaneous igniter.

Instead of the timing fuse being ignited by the ignition of the material in the screw 12, a detonator may be adopted to ignite the fuse 20. A hole 22 is bored in the fuse 20 at a suitable point for determining the time at which the explosive or mine is to be exploded.

As regards the method of conveying water to the potassium, the modes described are satisfactory and advantageous, but it may be done in other suitable ways.

With regard to the explosion of the mine 2 shown and described with reference to Figs. 1, 2, and 3, the ignition and explosion is effected by the fracture of one of two, three, or more hinged tubular arms 25, carried by the mine 2. These arms 25 are supported on trunnions 26, and when the mine is in the case 3, they are disposed vertically, and lie in recesses 27 of the mine body; but when the mine is ejected from the case 3 they fall by gravity into the horizontal position shown in Fig. 3; and when a vessel comes in contact with the mine, these arms, or one of them, being of a light and frangible form, at the outer end, will be broken, and so will admit water to the interior, and inner end near the hinge 26, which constitutes the igniting portion or fuse proper; this portion being made according to the construction set forth above with reference to Figs. 6 and 7. With regard to the detail of this arm shown in Fig. 4, the tube 25 has within it another tube 28, which, when the water gets to it by the breaking of the main outer tube 25, passes along the inner tube to the igniting chamber 17, where the potassium or the like therein, will be ignited by the water, and burn in the presence of the air which is also in the chamber 17, beyond which the explosive chamber 13 is provided, and this explosion will fire the mine 2. A packing 15 separates the chambers 13 and 17. The inner end of each tubular arm is closed by a plug 11, which consists of a non-corrosive substance; or, if desired, it may be corrosive, in which case, if the mine is not struck, the corrosion by the salt-water will eventually enter the fuse, and destroy the explosive and power of the fuse, so that the mine may be recovered, and is harmless.

In some cases, if desired, at the end of the plug 11 of the arm 25, a detonator at 29 is placed in the mine, which is fired by the explosion of the fuse in the manner described, and insures the firing of the main explosive. In the detailed description of this arm shown in Fig. 4, the same figures of reference are used in connection with the fuse parts, that are used for corresponding parts in Figs. 6 and 7.

As stated, the construction shown in Figs. 1 to 4 gives a complete projectile-mine of the type which can be fired from a gun of ordinary construction, and automatically sets itself for firing, and automatically moors itself. That is, this apparatus comprises— prior to projecting it—an outer case or shell 1, a mine proper 2, and a buoy inclosing it, as well as the moorings, consisting of the casing 3. And when the shell is fired from a gun, upon it falling into the water, the case 3 with the mine 2 is expelled from the shell 1, and then the mine proper 2, is expelled from the casing 3. The shell 1 goes to the bottom, and being connected with the mine 2 proper with a mooring line 5, this keeps the mine in the required position or locality, and the mine itself is kept up at the required depth from the surface by the case 3, which then acts as a floater or buoy, it being connected with the mine 2 by a mooring line 4.

With regard to the means or agents for separating the parts, that is, effecting the ejection of one from the other, as ejecting the case 3 with the mine 2 from the shell 1, compressed air may, in some cases, be employed in compartments or spaces in the shell, or parts.

Referring to the construction of the shell 1 and its parts, and the mode of, and means for, expelling the case 3 with its contents, the shell proper 1 has at its base a breech block 31, suitably secured in the shell, which, after being fired, and the shell has fallen into the water, is blown out by a charge of explosive in the chamber 33, formed in the breech block or tail of the shell, and fired by a water ignited fuse of the character above described, of which 34 represents a case or tube in which said fuse is disposed. The chamber 33 is separated from the mine case 3 by a diaphragm or plate 35, which fits and is held on a shoulder in the shell on one side, and is held in place, and made a fit with the shell by the inner edges of the cylindrical portion of the breech block 31. The breech block 31 may be suitably held in place by a light screw-thread 32, which will be "forced" or stripped when the breech block expelling explosive in the chamber 33, is fired. Or, in lieu of a screw thread, any known mechanical means for holding the block in position, but which would be "forced" by the explosion, may be used. In connection with this water fuse in the breech block 31, there is in some cases, as in the case shown, a covering cap or plug 36, which normally covers the opening in the fuse seating, and has connected with it a check line 37 in some cases, which insures it being removed as the shell leaves the gun. When this cap or plug is removed, and the shell falls into the water, the water has access to the fuse within the tube or case 34, and it acts in the manner hereinabove described. After the breech block has been forced out, the breech diaphragm 35, and the mine buoy case 3 are free to be ejected together from the shell, and this is effected by compressed air held in a chamber 38 in the head of the slot, which can act as soon as the breech block is gone; the compressed air being supplied to this chamber 38 through a hole 39 in the head of the shell, with a suitable non-return valve on it, to prevent the air escaping after it has been supplied; and a screw closing plug 40 is fitted into the end of the hole 39, to permanently close the opening after the chamber 38 has been charged. When the mine 2 and its case 3, which constitutes the buoy, are thus ejected, the mine 2 is ejected from the case 3 by compressed air held in a chamber 43 in one end of it—which is closed; the mine proper 2 being disposed in the other end—which is open.

The chamber 43 is separated from the other end of the case 3 in which the mine 2 is disposed, by a piston 44, and the air is supplied conveniently to the chamber 43 from the compressed air chamber 38 of the shell, through a suitable hole extending longitudinally through the mine 2, and through a small air passage 45 in the piston 44, which has on it a suitable non-return valve, to prevent the air escaping from the chamber 43 when charged. It will be seen therefore, that as soon as the case 3 is ejected from the shell 1, the compressed air in the chamber 43 will force the piston 44 down, and so expel the mine 2; the downward movement of the piston being limited by a check line 46, which holds the piston in position near the bottom of the case 3, and closes this end of the case, and the case thus becomes an air-filled buoy, which acts as a floater to the mine proper 2, the mine being connected to the lower side of the piston 44 by the mooring line 4, which will keep it just at the right distance below the surface. With regard to the hole 45, if the air is allowed to leak into the chamber 43 from the chamber 38, the hole is not required. The periphery of the piston 44 will be supplied with any suitable kind of packing, to provide an air-tight joint between it and the casing.

In some cases, if dissolving plugs 11 are not used in the arms 25, the buoy or casing 3 of the mine has connected with it a sinking device or tube generally designated 48, formed in the air case or chamber 43. This tube has two soluble parts or plugs 50 and 51, while the tube 48 itself is composed of any suitable known acid-resisting substance. Both of these plugs may be made say of zinc, or other suitable metal, soluble either by acid or water. If the plugs be of zinc, and the incorrosible tube is charged with spirits of salts, and these two plugs 50 and 51 are of different thicknesses, as shown, the thinner, which is the upper one, will be first destroyed by the acid, and afterwards the lower one, which is connected with the air chamber 43 of the buoy. When these two plugs are destroyed, the air in the buoy can escape, allowing the mine to sink and pull the buoy with it.

The top of the tube 48 is provided with a brass or other like plug 52, by which it is filled with the acid or corrosive substance. If the sinking tube be charged with nitric acid, and a steel capsule 53, shown in dotted lines in Fig. 8, charged with potassium or the like, be inserted in it, as soon as the nitric acid touches it—the potassium—a violent explosion takes place, which will destroy the buoy, and so sink the mine.

The moorings 5 for mooring the mine proper 2 to the empty shell 1, which will lie on the bottom, are arranged in some cases as shown in Fig. 5. That is, it—the mooring line—is coiled in the chamber 38 in the head of the shell, so as to obviate fouling, by providing between the coils of the line, thin layers 54 of suitable material, such as paper, to keep the several coils distinct and separate from one another. Or, according to another method, when the line is properly coiled in the chamber, a suitable adhesive, such as wax, may be run in between the coils, so that they will be retained in their position until a strain comes upon them, when they are torn from the wax as the shell sinks.

In some cases, where buoys of very large carrying capacity are necessary or desirable, they are constructed in telescopic form as shown in Fig. 10. That is, outside the main case 3 there are other cases 55 and 56 of larger diameter, closed at one end, and open at the other, the open end of the successive cases fitting over the next smaller case; and the edge of this open end is turned in as shown; while the closed top of each case has an overhanging flange at 57, making an annular space between the successive cases, and in the lower part of which suitable packings 58 are provided to make joint between the different lengths when they are extended.

The cover of the main case 3, and the case 55, next it, are provided with non-return valves 59, which, when the buoy case is discharged from the main shell 1, are lifted by the air, and the compressed air in the main case 3 can pass up in the other cases 55 and 56, and fill them, and force them out to the extended position shown in Fig. 10. The piston 44 in this figure is shown forced down to the bottom of the main case 3, and there held by its check line 46.

With regard to the construction shown in Fig. 9, there is illustrated in this figure a means of giving the projectile mine a rotative or revolving motion when fired from the gun, say a smooth bore gun. This means consists of long-pitched spiral projections 60 (or instead of projections grooves may be employed) upon its outer surface, and over which is suitably fitted an envelop or jacket 61 made of soft metal, such as thin brass which, when the mine is fired from the gun, is held by and chokes the bore, and in freeing itself, the shell receives the revolving motion.

In the modification shown in Fig. 11, the circle marked 10 represents the breech of the fuse, and at this part the shell has a shallow groove, in the center of which there is situated the fuse, or a fuse casing 34, as shown in Fig. 1.

The fuse casing or head of the fuse is covered by a thin metal strap 64, lightly fastened at 65 to the shell at one end, and weighted at the other end by lead weight 68, a section of which is shown in Fig. 12. This strap takes one turn round the shell, and the loose end is held or fastened in the groove by forcing the end weight 68 into the groove. On being fired from the gun, the revolving of the projectile causes the strap 64 to uncoil, and it will fly off, thus leaving the vent of the water fuse open, so that water can act upon it as soon as it falls into it.

As a modification of a mode of covering the fuse when inserted at the side, as above described with reference to and shown in Fig. 11, a simple covering cap 66 shown in Fig. 13, fitting in a hole in the shell of corresponding shape, is used, in the bottom of which the water inlet regulating device or inlet is disposed, the outer surface of the cap being flush with the surface of the shell. It is obvious that this cap would be retained in the hole as long as the shell was in the gun, but would afterwards be thrown off by centrifugal force in the flight of the missile. This side fuse arrangement would be used more especially in connection with shells used as projectile-mines, that is, missiles which, when they strike a vessel sink direct down, and when they have sunk a certain depth, explode in the true manner of a mine near the bottom of the ship; the head in such cases of the shell being of course made of soft material, which, on impact crushes or spreads out, and the shell does not penetrate the hull.

In the case in which the article or missile according to this invention acts as a projectile-mine or torpedo, the buoy and the breech plate above referred to are not employed, but the interior of the shell is charged with an explosive in any suitable form, and filled into the shell, in any convenient way. This modification is illustrated in Fig. 14 in longitudinal section. The fuse—preferably a water ignited fuse is inserted in the side of the shell 1, (on the breech block 31 if desired) and when fitted with it, the projectile is ready for firing; the projectile or shell in this case, if used against ships, having a soft head as above described, and of the "square" form.

When the projectile-mine strikes a ship or vessel, it does not penetrate, owing to the soft head, but falls dead alongside, and when reaching the water, the water can freely act on the water igniting fuse, or a detonator used in connection with a time fuse as shown in Fig. 7 ignites the fuse, and according to the setting or timing or regulating of this fuse, the projectile-mine or torpedo will be exploded, practically, under the ship's bottom, at the depth decided on.

In using the mine against submarines, or under like conditions, the projectile mine or shell should be in cup-headed form, as shown at 8 in dotted lines in Fig. 1, which will prevent it from ricochetting, and cause it to sink in the spot at which it strikes the water, when the water igniting fuse, acting as before described, will cause it to explode.

The projectile-mine or torpedo, in its various forms, is a perfectly safe weapon for handling, and for storing in ship's magazines, or otherwise, and is quite harmless until the fuse has been inserted.

With regard to entanglements, any sort of such entanglements may be employed in connection with say the mooring line 5, such as cords 67 with floaters 68 on them, which will be of such flotative power as will keep them extended, and about the horizontal position, as shown in Fig. 15; and these entanglements may be made wholly or partly of explosive material, and have connected with them suitable detonators, by which they are exploded, and the whole mine, if drawn into contact with the ship.

It will be plain that in connection with the air passages, where required, air valves will be used to prevent the flow or escape of air, and retain it in the various chambers; and also that where required, for the keeping in of air, checking of fire, and protection against dust caused by the explosion of the propelling or projecting charge, asbestos or other wads or washers and requisites of this kind, which serve the usual purposes, and which will be plain to those skilled in this class of gunnery and torpedo work, will be provided.

What is claimed is:—

1. A projectile mine comprising a shell, a casing therein, an explosive charge in said casing, and means comprising water and a substance capable of chemically acting therewith and forcing said casing from the shell after the shell enters the water.

2. A projectile mine comprising a shell, a casing within the shell closed at one end and open at the other, an explosive charge within the casing, a removable part on the shell, means for forcibly removing said part on the shell reaching the water, and means for forcing the casing out of the shell.

3. A projectile mine comprising a shell having a part which is forcibly removed on the mine entering the water, a casing within the shell having a chamber at one end thereof for compressed air, a piston within said chamber, and an explosive charge at the other end of said casing.

4. A projectile mine comprising a shell, an outer case within said shell and adapted to serve as a float, a casing containing an explosive charge within the outer case, and flexible connections between the shell and casing and between the casing and the outer case.

5. A projectile mine comprising a shell, an outer case within the shell and adapted to act as a float, a casing within said outer case, an explosive charge within said casing, means for forcing said elements apart when the shell enters the water, and an igniting fuse connected with the explosive charge, said fuse containing potassium.

6. A mine comprising a shell having a chamber therein, a removable block at the end of the shell inclosing said chamber a casing containing an explosive charge within the chamber and leaving a space at both ends thereof, the front space containing compressed air, an explosive charge in the rear space, and means for exploding said charge on the shell entering the water, so as to blow out the block.

In testimony whereof I have signed my name to this specification in the presence of two subscribing witnesses.

THOMAS GERALD FITZ GIBBON McCOMBIE.

Witnesses:
L. VERE WILSON,
FRANK CHARLES MALLET.